Feb. 3, 1970  E. L. BARRETT  3,493,800
BRUSHLESS ALTERNATOR
Filed June 12, 1968  4 Sheets-Sheet 1

INVENTOR.
Edward L. Barrett
BY
His Att'ys

Feb. 3, 1970  E. L. BARRETT  3,493,800
BRUSHLESS ALTERNATOR
Filed June 12, 1968  4 Sheets-Sheet 2
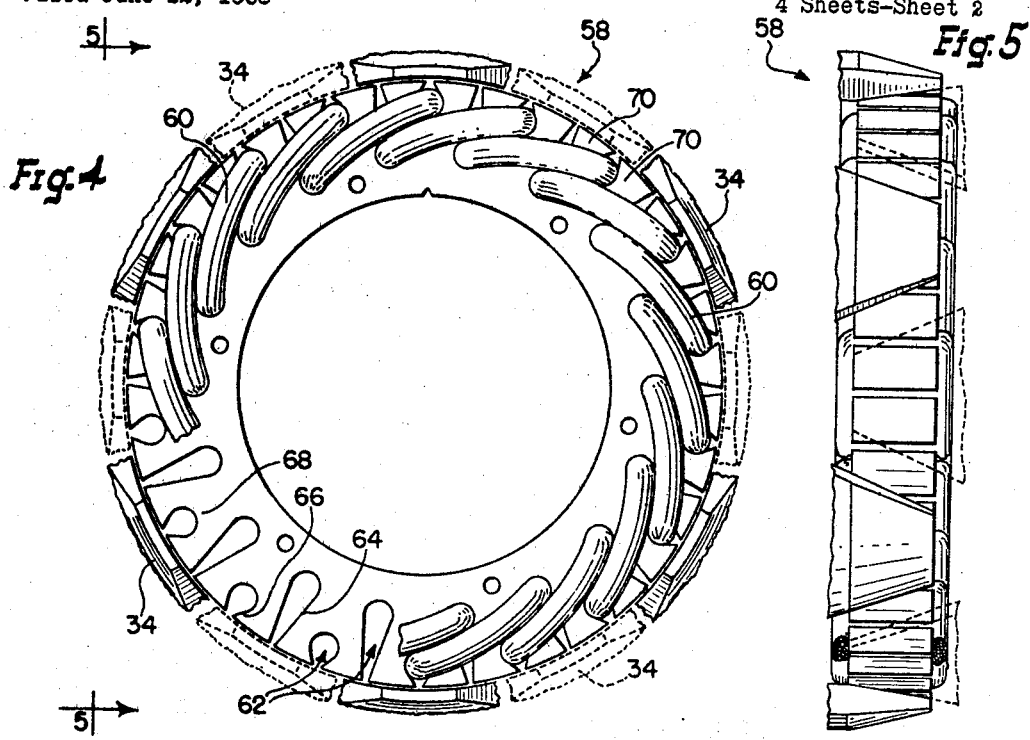
Fig. 4
Fig. 5
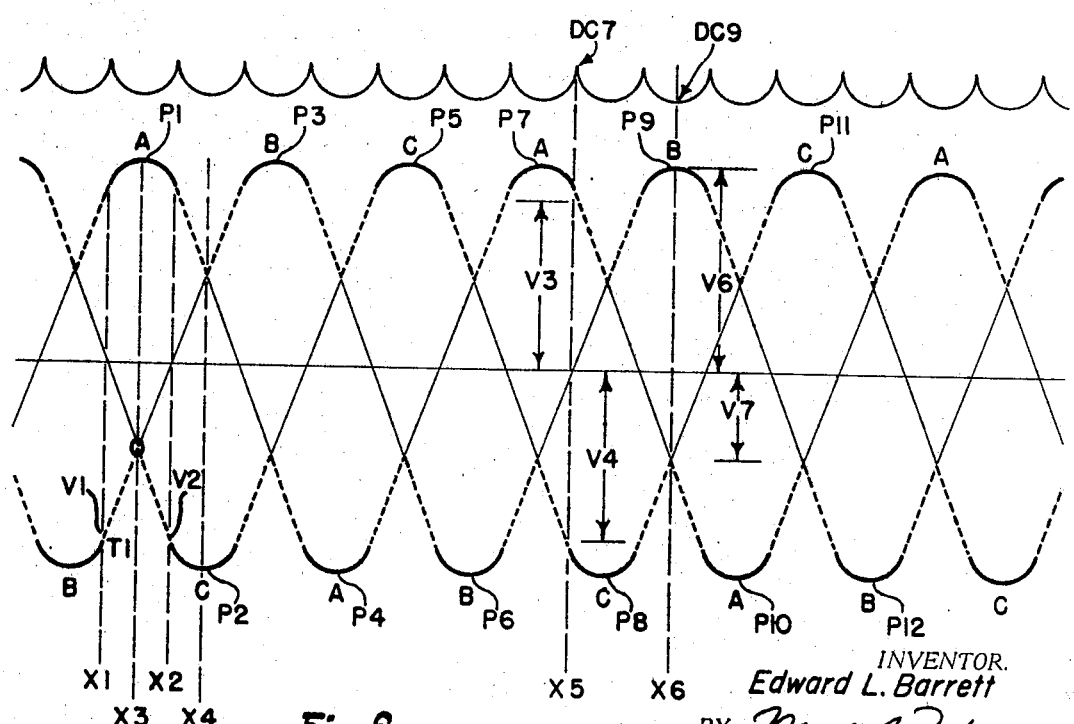
Fig. 6
INVENTOR.
Edward L. Barrett
BY
His Att'ys

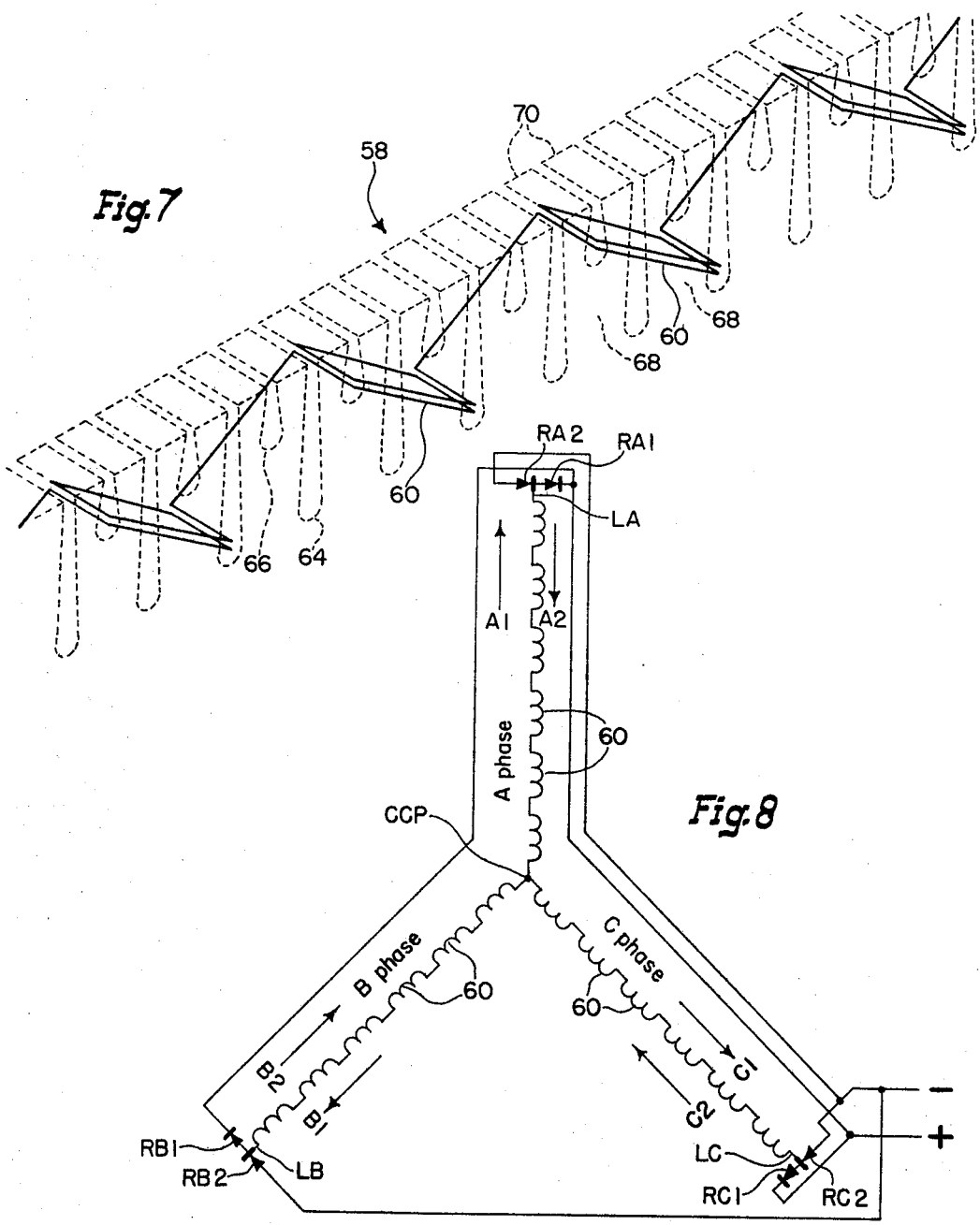

Feb. 3, 1970  E. L. BARRETT  3,493,800

BRUSHLESS ALTERNATOR

Filed June 12, 1968  4 Sheets-Sheet 4

INVENTOR.
Edward L. Barrett
BY
His Att'ys

United States Patent Office 3,493,800
Patented Feb. 3, 1970

---

3,493,800
BRUSHLESS ALTERNATOR
Edward L. Barrett, La Grange Park, Ill.
(8501 W. Higgins Road, Chicago, Ill. 60631)
Filed June 12, 1968, Ser. No. 736,329
Int. Cl. H02k *17/42*
U.S. Cl. 310—168         17 Claims

ABSTRACT OF THE DISCLOSURE

A brushless alternator including stationary and rotary elements which are arranged with respect to one another to provide a unidirectional magnetic flux path therethrough, including across a gap or gaps of sufficiently limited extent, for inducing an alternating voltage in the output winding of a stator. The rotary elements of the alternator are entirely supported by an elongated support member of magnetic material which may be supported solely at one end by a bracket or an end wall of a housing. The support member carries an exciting winding and includes bearings at either end of the exciting winding which firmly support the rotary elements in such a way that extremely fine air gaps may be maintained. In one embodiment, the rotary elements are mounted on a rotatable shaft which is journaled internally of the support member and comprises a portion of the flux path.

---

The output of a three phase alternator is frequently used in connection with an alternating current to direct current rectifying system for a storage battery, as in a vehicle, to recharge the battery during operation of the vehicle. In general, three phase alternators basically comprise direct current excited electromagnets or permanent magnets whose magnetic flux cuts the turns of three sets of overlapping coils associated with a stator, the coils being connected in three separate circuits, usually in either a Y or delta connection.

More specifically, three phase alternators generally include a laminated annular stator, usually having 36 magnetic poles, although other numbers which are multiples of six may be used. The poles are defined by slots into which a three phase delta or Y output winding is inserted. Exciter means is required to cause magnetic flux to alternate in direction in the stator poles for inducing an alternating voltage in the winding.

While the exciter means may include permanent magnets as noted above, a more typical arrangement is the use of a pair of magnetizable pole pieces usually having six exciter poles to correspond with the 36 poles of the stator. The poles of each exciter pole piece have the same polarity with respect to one another, but are of opposite polarity with respect to the poles of the other pole piece so that the pole pieces may be arranged with alternating poles of opposite polarity by having the pole pieces interleaved with respect to one another. The pole pieces, when so disposed with respect to one another, are then frictionally mounted or otherwise secured to a shaft made from magnetic material. An exciter coil, energized through slip rings and brushes from a direct current source, surrounds the shaft and rotates with it. When the exciter coil is energized, unidirectional magnetic flux is established in the shaft and the exciter poles. This assembly is mounted with respect to the magnetic poles of the stator so that the exciter poles, first of one polarity and then of the other, pass the stator poles to induce alternating flux therein which then induces an alternating voltage in the output winding.

If the alternator is intended for service on a vehicle, in conjunction with a storage battery, an alternating to direct current rectifying system is required. The current method is to mount two groups of three diode elements each, corresponding with the three phase output winding, into one of the case halves which surround the alternator. Since the stator is mounted with respect to the case halves, the alternating voltage may be easily collected and passed through the rectifying complex.

While alternators of the general class described above have replaced direct current generators on vehicles, due to the elimination of brushes and a commutator which spark, and are subject to wear and thus periodic servicing, alternators in present use still require another form of relatively sliding contact members in the forms of slip rings and brushes which connect the rotating exciting coil to the direct current power source. In present day alternators where the exciting coil rotates with the exciting pole pieces, the voltage from the regulator is customarily lowered when desired by having a resistor introduced in series with the exciter coil. The voltage drop across the exciter coil and the resistor is in proportion to the direct current resistance of these two elements resulting in the wattage consumption of the resistor being wasted as heat. This is a very inefficient way of reducing excitation.

In addition to eliminating the need for slip rings and brushes, the alternator of the present invention could be used if desired without dropping resistors in the regulating system by providing a plurality of exciting coils to regulator leads. Accordingly, excitation of the alternator could be varied over a wider range without slip rings, brushes or dropping resistors, and at no additional expense except that of a multiple tapped coil as compared to a single section coil.

It is the primary object of the present invention to provide a brushless alternator which overcomes the aforementioned deficiencies of the prior art alternators.

Another object of the present invention is the provision of a brushless alternator which, by reason of its structure, establishes a unidirectional magnetic flux in the exciting system of the alternator without requiring the need for slip rings or brushes.

More specifically, it is an object of the present invention to provide a new and improved brushless alternator having an exciting system which includes stationary and rotary elements for establishing a unidirectional magnetic flux therein for inducing an alternating voltage in an output winding of a stator, the leads from the exciting coil of the exciting system and/or from the output winding of the stator capable of being passed through the stationary element of the exciting system, without the need for slip rings or brushes.

Other objects of the present invention include the provision of a brushless alternator which requires a minimum number of parts, is economical to manufacture and use, is reliable over long periods of operation, is explosion proof, generates a minimum of radio interference, and is otherwise well adapted for the purposes intended.

The present invention is also directed to a new and improved stator device which is peculiarly, though not exclusively, adapted for use with the brushless alternator of the present invention. Annular stators in present use are provided with inwardly openings slots into which an output winding is inserted. Hand insertion of the output winding into such slots is prohibitive cost wise, and equipment expenditure for machine insertion is relatively high. Further, when output windings are disposed into uniformally deep inwardly opening slots, such as is customary in prior art alternators, additional wire must be allowed for each winding of the three phase convolution, and this increases the resistance of the windings as well as the cost for the additional wire, not to mention the tendency of the wires to become distorted as they are disposed within the slots and interfere or block subsequently inserted windings.

Accordingly, it is another object of the present invention to provide an improved stator device or element which provides rapid insertion of windings into slots of the stator device or element without subsequent interference or distortion of other windings to be associated with the stator device or element, and at the same time utilizes a minimum amount of wire in tightly wound coils, thereby reducing the costs and electrical resistance of the winding.

A further object of the present invention is the provision of a stator device or element of the aforementioned type which is provided with outwardly opening slots for receiving windings to provide the advantages set forth above.

All of the above and other objects and advantages of the present invention are attained by the provision of a brushless alternator including a stator having an output winding, and exciting means for inducing an alternating voltage in the output winding, the exciting means including stationary and rotary elements which are arranged relative to each other to establish a unidirectional magnetic flux path therethrough. The exciting system may further include an exciting coil fixedly mounted to the stationary element thereof, and the leads from the exciting coil, or the leads from the output winding of the stator when fixedly mounted relative to the stationary element, are capable of being disposed within the passageways provided in the stationary element of the exciting means. The stator device may preferably also be provided with outwardly opening slots to receive a three phase output winding.

Reference is now made to the drawings wherein:

FIG. 4 is an enlarged fragmentary side elevational view of one form of stator and associated output winding which is capable of use with the brushless alternator of the present invention;

FIG. 5 is an end elevational view of stator device or element shown in FIG. 4;

FIG. 6 is a composite diagrammatic representation of the three wave forms resulting from the alternating voltage induced into the three phase output winding of the stator;

FIG. 7 is a perspective representation, generally diagrammatic in form, illustrating the manner in which each winding of the three phase winding is disposed within the outwardly opening slots of the stator device or element illustrated in FIGS. 4–5;

FIG. 8 is an electrical circuit or diagram depicting the Y or "star" connection of the three phase output winding of the stator;

Figure 1:
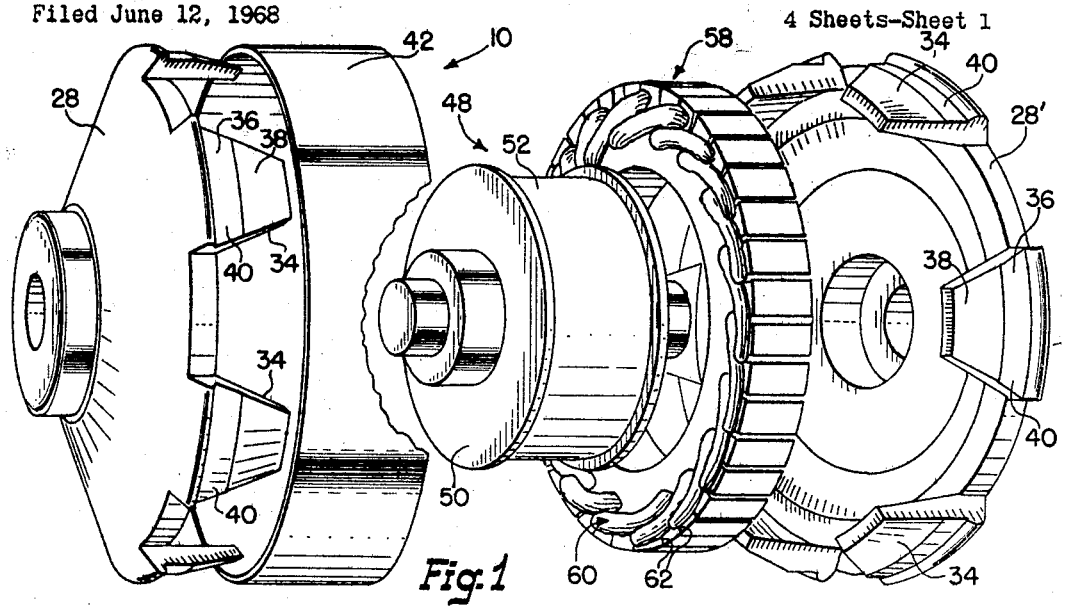
FIG. 1 is an exploded perspective view of a brushless alternator constructed in accordance with the principles of the present invention.
Figures 2, 3:
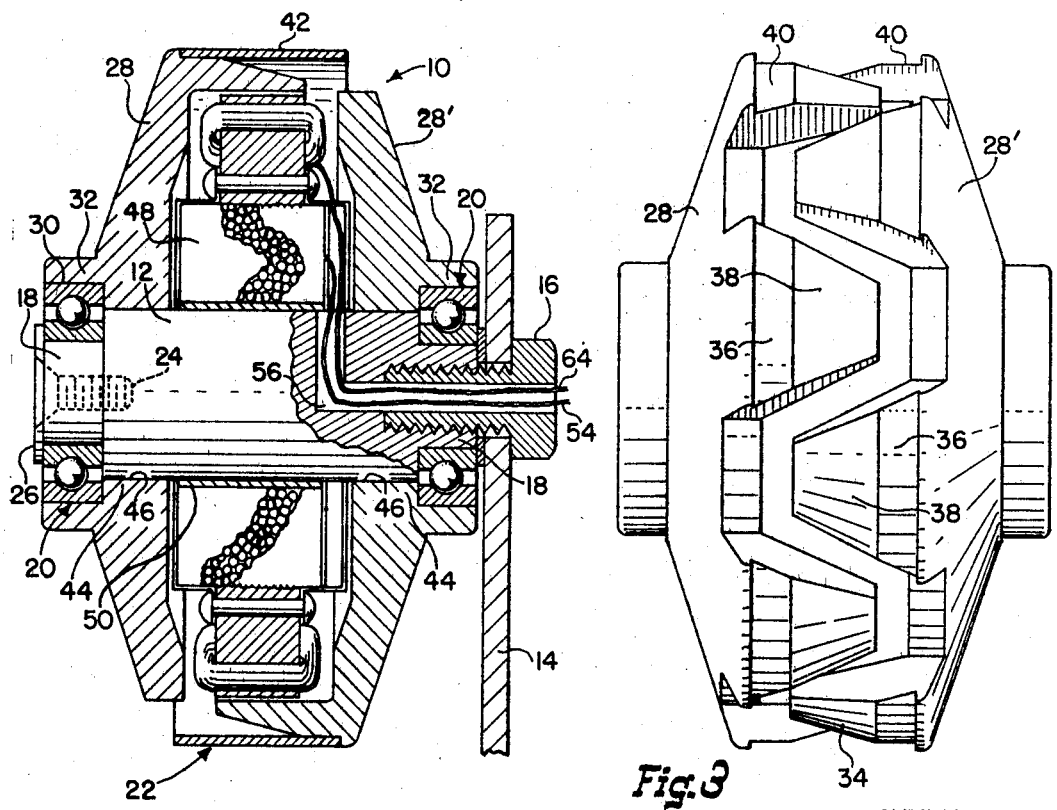
FIG. 2 is a fragmentary side elevational sectional view illustrating the manner in which the various components of the brushless alternator are assembled relative to one another.
FIG. 3 is a side elevational view of the brushless alternator without the frictionally mounted retaining ring assembled relative to the exciter pole pieces.

Reference is now made to FIGS. 1–3 for a description of the various components which form the brushless alternator 10. A cylindrical stationary support member or shaft 12 is provided to permit mounting of the alternator 10 relative to a vehicle engine or other apparatus as well as to support various components of the alternator which will be described. As best seen in FIG. 2, the support member 12 is mounted to a bracket or panel 14 by way of a hollow threaded stud member 16 which is threadably connected to the support member 12. It will be apparent that other types of supports and/or fastening devices may be used in supporting the alternator 10 relative to a vehicle engine or other apparatus.

The support member 12, at opposite ends thereof, is provided with reduced diameter sections 18 for receiving the ball bearing assemblies 20 which mount the rotor assembly 22 for rotation relative to the support member 12. The reduced diameter sections 18 are suitably dimensioned to receive the ball bearing assemblies 20, at opposite ends of the support member 12, and fastening means are provided to retain the ball bearing assemblies relative to the support member 12 and rotor assembly 22. As best seen in FIG. 2, there is provided at the lefthand side thereof a threaded screw member 24 which is threadably connected to the support member 12 and a plate 26 which is held in position against the end of the support member 12 by the threaded fastener 24, the plate 26 having a sufficient dimension, as illustrated, to clamp the ball bearing assembly 20 at the lefthand side of FIG. 2 in the position shown. At the righthand side of FIG. 2, the bracket 14 and threaded hollow fastener 16 clamp the ball bearing assembly 20 there located in the same manner as the threaded fastener 24 at the left hand side thereof. In this way, the ball bearing assemblies 20 are suitably axially restrained relative to the support member 12.

The support member 12 and associated ball bearing assemblies 20 support the rotor assembly 22 which comprises an axially spaced pair of exciter pole pieces 28, 28' at the left and righthand side of FIGS. 1–3. Each of the pole pieces 28, 28' has a dished-shaped body with a centrally located aperture 30 which is capable of receiving the ball bearing assemblies 20. Each of the centrally positioned apertures 30 are formed in an axially extending neck portion 32 which is integrally connected to the dished body portions of the exciter pole pieces 28, 28' and which is directly supported by the ball bearing assemblies 20, 20 to provide movement of the rotor assembly 22 relative to the support member 12.

Each of the exciter pole pieces 28 is further provided with a plurality of circumferentially spaced exciter poles 34, six in number, which are integrally connected to and extending substantially normal relative to the outermost periphery of the dished body portions of the exciter pole pieces 28, 28'. All of the exciter poles 34 of a particular exciter pole piece 28, 28' are of the same polarity such that when the exciter pole pieces are interleaved in the manner shown in FIG. 3 of the drawings, there will be alternating poles of opposite polarity.

Each of the exciter poles 34 of the exciter pole pieces 28, 28' are tapered in width and thickness from the outerfree extremity thereof toward the connection of the exciter poles 34 with the dished body of the exciter pole pieces. Tapering the exciter poles 34 in width enables the exciter pole pieces 28, 28' to be interleaved as shown in FIG. 3 of the drawings, with the thicker portion adjacent the dished body portion of the exciter pole pieces minimizing leakage of useful flux between the interlaced north and south poles of the exciter pole pieces 28, 28'. The thicker in width portions of the exciter poles 34, as at 36, permit each of the exciter poles 34 to cover three stator poles, as will be discussed in detail hereafter, while the thinner in width portions of each exciter pole 34, as at 38, permit such portions to cover at least one stator pole. Thus, the build-up and decay of flux in the stator pole of a stator member is consequently very gradual.

As pointed out above, the exciter poles 34 also taper in thickness from the outerfree extremity thereof toward the dished body portion of the exciter pole pieces to save weight. This is permissible because the thicker portions 38 of the exciter poles 34 carry all of the flux linking the exciter poles 34 to the stator poles, whereas the narrower portions carry only a portion of the flux.

Each of the exciter poles 34 is provided with a land portion 40 in the vicinity of the thicker in width portions 36 for receiving a non-magnetic ring 42 which is mounted over the exciter poles 34 of the exciter pole pieces 28, 28' as best seen in FIG. 2 of the drawings. This non-magnetic ring is either frictionally mounted on the exciter poles 34 or retained by suitable fastening means to maintain the concentricity of the pole pieces 34 as well as the spacing of the north and south poles of the interleaved or interlaced exciter pole pieces 28, 28'. Thus, the exciter pole pieces 28, 28' and the non-magnetic ring 42 will rotate in unison as the rotor assembly 22 with respect to the fixed or stationary support member 12 by reason of the bearing assemblies 20. It will be noted that inner annular portions 44 of the exciter pole pieces 28, 28' spaced inwardly from the bearing assemblies 20, are in very close proximity to the stationary or fixed support member 12. The gaps between the stationary shaft 12 and the inner annular portions 44 of the exciter pole pieces is very small, on the order of .0025 inch, so that magnetic flux can be abridged across the gaps 46 as will be explained. The bearing assemblies 20 provide an effective means of maintaining a predetermined dimensional relationship between the stationary support member 12 and the inner annular portions 44 of the excited pole pieces to provide these very limited extents of the gaps 46 so as not to interfere with the unidirectional flux path to be established through the exciter pole pieces and stationary shaft.

An annular exciter coil 48 is fixedly mounted to the stationary support member 12 by suitable means within the rotor assembly 22 in the space between the exciter pole pieces 28, 28'. The exciter coil 48 includes a spool type element 50, preferably made from low carbon steel, which serves to contain a plurality of exciter windings 52. The exciter windings may be of the type which is coated with a material which, when heated, will cause adjacent convolutions to adhere together in a unitary mass. It will be apparent to those skilled in the art that various types of exciter coil devices may be utilized within the scope of the present invention, it being recognized that the illustrated embodiment in FIGS. 1-3 is shown for exemplary purposes only.

The exciter coil 48 includes leads 54, comprising opposite ends of the exciter winding 52. One of these leads is preferably grounded and the other lead is disposed within a passageway 56 formed in the stationary support member 12 as shown by axially drilled and crossdrilled holes. The leads 54 are connected to a direct current source, such as a battery in a vehicle, to provide sufficient excitation in the exciter coil 48 to establish a unidirectional flux path in the stationary support member 12 and the exciter pole pieces 28, 28'. By enabling the underground lead 54 to be passed through the stationary element forming part of the exciting means for the brushless alternator, there is no need for slip rings or brushes, thus eliminating a potentially troublesome problem.

When the exciter coil 48 is energized from a DC power source, such as a 12 volt storage battery, unidirectional magnetic flux will be created in the stationary support member 12 and in the rotatable exciter pole pieces 28, 28', thus in the poles 34 carried by the exciter pole pieces 28, 28'. The flux path between the stationary support member 12 and the pole pieces 28, 28' will be completed across the gaps 46 due to their sufficiently limited extent as aforementioned. The linking of relatively high numbers of lines of magnetic force between relatively rotating parts might be thought to have a magnetic braking effect; however, because there is no change in the polarity of the flux across the gaps 46 and no change in reluctance of the gaps 46, there will be no braking effect. It has been previously indicated that the bearing assemblies 20 maintain the predetermined dimensional relationship of the annular magnetic gaps 46 ot achieve the desired ends.

The unidirectional magnetic flux in the stationary support member 12 and the exciter pole pieces 28' 28' of the rotor assembly 22 is designed to induce an alternating voltage in a stator element, the essential purpose of which is to establish an alternating current which, when converted to direct current, will recharge the storage battery or perform another similar function as may be desired. In the illustrated embodiment of FIGS. 1-3, the stator element 58 is mounted directly upon and affixed to the exciter coil 48 the stator element 58, which is also made from a magnetizable material, and is provided with a three phase output winding 60 which is disposed as best seen in FIGS. 4-5 and 7 of the drawings. While the stator core 58 illustrated in FIGS. 1-2, 4-5 and 7 of the drawings is one preferred embodiment, various other types of stators may be used in the brushless alternator of the present invention.

In the FIGS. 1-3 embodiment, the stator 58 is preferably mounted to the exciter coil 48 within the rotor assembly 22 as best seen in FIG. 2 of the drawings, the exciter coil 48 being insulatingly mounted with respect to the stator 58 so that leads 65 may also be disposed in the passageway 56 of the stationary support member 12.

Although the stator element 58 is only one form of stator which may be used with the brushless alternator of the present invention, it is believed that a specific description thereof at this particular point will facilitate an understanding of the operation of the present invention. Reference is therefore made to FIGS. 4-5 and 7 for a specific description of the stator elements 58. The stator element 58 comprises an annular member provided with an output winding 60 which is positioned into a plurality of slots 62. The slots 62 open outwardly relative to the outer face of the annular member to facilitate insertion of the winding 60 which is preferably of the three phase type as will be described. The slots 62 have an elongated triangular shape and are generally radially directed with respect to the axis of the annular core. The slots 62 form relatively deep and shallow slots 64, 66 respectively which alternate around the periphery of the annular core. The relatively deep slots 64 extend beyond an imaginary circular midline of the annular core whereas the relatively shallow slots terminate short of such a midline, the relatively shallow slots being approximately one-half the radial length of the deep slots. It will be recognized that adjacent deep slots 64 will form a long stator pole 68 which is bisected by a shallow slot 66 to form two smaller stator poles 70, there being 18 long stator poles and 36 short stator poles to correspond with the six exciter poles 34 of the exciter pole pieces 28' 28'.

By providing outwardly opening slots 64, 66, the three phase winding 60 cannot only be easily inserted within the slots, but the outside diameter of the annular stator core is considerably smaller than a core having inwardly opening slots such as used in present alternators. Further, the cross-sectional areas of the bodies of the stator poles, because of the relatively deep and shallow slots and the manner in which the three phase winding 60 is disposed in such slots as will be presently described, will be greater than a larger core having inwardly or outwardly opening slots of uniform depth. It is well known that an increase in the cross-section of a magnetic path decreases reluctance and therefore increases efficiency, a concept which is taken advantage of in the construction of the stator 58. The tips of the stator poles 70 also provide a relatively large area which is an important consideration in the design of stator poles for alternators. Since the stator poles are scanned by exciter poles, they should be as large in area as is practicable and uniform in area so that the reaction of the exciter poles is the same for all stator poles. It will be noted that the generally triangularly-shaped slots 64, 66 provide relatively small gaps in the outer periphery of the annular core which not only restricts possible unraveling and consequent interference of the three phase winding when inserted within the annular core, but also makes the size of the tips of the stator pole 70 as large as possible.

The three phase winding 60 is partially inserted into a relatively shallow and deep slot 64, 66 as shown in FIG. 4 of the drawings. Specifically, the windings are inserted into every other shallow and deep slot 64, 66 respectively to provide a number of advantages. In the first place, the windings 60 are positioned in non-overlapping relationship with respect to one another, and thus no winding or coil crosses over any other, and thus the need for less wire for the windings or coils which increases the resistance of the winding and reduces its efficiency. Secondly, each winding or coil, of which there are 18 in the 36 stator pole construction, surrounds three stator poles 70 in a manner which enables the windings to cross larger cross-sections of magnetizeable material than would be possible where the windings were disposed in uniform slots. Additionally, the stator 58 is of extremely compact construction in both overall height and axial width when the windings 60 are associated therewith.

Each of the windings 60 surrounds three stator poles 70, that is, each winding surrounds one of the broad based poles 68 which, since it is bisected by a shallow slot 64 providing two stator poles 70, the other being provided by the disposition of the winding 60 within a shallow slot 64 bisecting two stator poles 70 of an adjacent broad based or long pole 68. Since the exciter poles are rotating in close proximity to the tips of the stator poles 70, there will at times be magnetic flux of opposite polarity in the bisected portions of a broad based or long pole 68. At such times, little or no flux will flow in the trunk of that broad based or long pole 68. At other times, the flux in both of the bisected portions is in the same direction and will have to flow through the trunk of the broad based or long poles 68. Because of the large width of the trunk of the broad based or long poles 68, flux can be carried from both of the bisected portions thereof without restriction.

The stator poles and windings are uniformly configured, arranged and distributed with respect to one another so that there will not be any unequal reaction occurring between any stator pole and an exciter pole which would affect the phase relationship of the three phase winding. If there is any unequal reaction, the alternator will not function as intended. It will be seen from the foregoing discussion that the stator 58 meets this criteria so that any reaction occurring between any stator pole and any exciter pole in the brushless alternator 10, whether it has north or south polarity, will be duplicated exactly with respect to another plate.

The three phase winding 60 in the stator 58 comprises three distinct windings which are commonly referred to as phase windings A, B and C. Each of the phase windings A, B and C comprise six coils or windings which surround three stator poles of the stator 58. The manner in which each phase winding is disposed in an annular stator body of the type represented by stator 58 is best seen in FIG. 7 of the drawings. There it will be shown that the stator annular body which is shown in dotted lines and stretched from a circular to a rectangular configuration to facilitate understanding thereof, has a single three phase winding which is disposed within the shallow and deep slots 64, 66 of the annular stator body in the manner depicted. Specifically, it will be seen that each of the windings or coils 60 are disposed into the every other shallow and deep slot 66, 64 respectively of an adjacent pair of broad based or long poles 68, the opposite end from each of the windings or coils 60 then bypassing adjacent broad based or long poles 68 adjacent to, but not surrounded by a particular winding 60. The opposite ends of each particular winding, after bypassing such adjacent broad based or long poles 68, will then be wound about an adjacent pair of broad based or long poles 68 in the same manner mentioned above. Each of the phase windings A, B and C are wound in this particular manner, it being realized that they will be wound about different stator poles to provide an operative stator construction.

Phase winding A, B and C are shown in a simplified three phase circuit diagram in FIG. 8 of the drawings interconnected to one another in the common "star" or Y connection. Each of the phase windings are shown in the three phase circuit diagram of FIG. 8 interconnected to rectifiers which are represented by the rectifier symbol, thereby providing a rectifying system for the alternating current in the three phases of the phase windings A, B and C to convert the alternating current to direct current. The rectifiers are so placed in the circuit diagram that current from a string of coils or windings 60 of one phase, having a higher voltage, will not flow back into a string of coils or windings 60 of another phase, having a lower instantaneous voltage, to permit the coils or windings 60 of the phase having the higher electromotive force to produce all of the current requirements of the connected loads.

Specifically, the three phases A, B and C each have six coils or windings 60 in strings, all wound in the same direction which are connected to each other at a common connection point designated CCP. The common connection point CCP is insulated from ground and other parts of the alternator circuit. The common connection point CCP enables current flowing in any one of these strings of coils or windings 60 to have a return circuit. As an example, current due to voltage developed in the A phase string of coils may return through either the B or C phase strings. The six coils or windings defining phases A, B and C also have leads LA, LB, and LC which are connected to the stems of six conventional diodes or rectifiers (not shown). As an example, the lead LA is connected to the stems of diodes RA1 and RA2. Rectifier RA1 is of the type that permits current to flow from the negative stem to the positive body of the rectifier whereas rectifier RA2 is of the type that permits current to flow from the negative body to the positive stem. The same type of relationship exists with respect to the rectifiers connected to the phase B and C windings or string of coils.

Lead LA of the A phase string of coils is connected to the stems of the rectifiers RA1 and RA2 so that current in the A phase strings flowing in the direction of the arrow A1 may find an outlet through the rectifier RA1, and may return through rectifier RA2 when the current in the A phase string of coils is in the direction of the arrow A2. The arrows A1 and A2 reflect the change in the direction of current flow involved in an alternating current which is reversed every half cycle. The polarity of the lead LA throughout one half the cycle is therefore positive while the polarity at the opposite end of the A phase string of coils, that is, at the common connection point CCP is negative.

In order to understand at which time current increments flow and the path they follow in the circuit diagram of FIG. 8, reference is made to the composite wave curve diagram of FIG. 6. The peaks of the half cycle loop of all the phases are shown in heavy lines, the dotted lines indicate the return path of the current, and the fine lines indicate the time at which no current flows. The peaks of the half cycle loops are rectified in the sequence indicated by P1, P2, P3, etc.

The peak P1 of the half cycle loop of phase A, above center or the zero lines in FIG. 6 of the drawings, starts at the vertical reference line X1 and ends at the vertical reference line X2. Vertical reference line X2 is also the starting point for the peak P2 of the half cycle loop of phase C below the zero line. The various phases come into play as soon as the voltage in one phase exceeds the voltage of another phase.

The vertical reference line X3 of FIG. 6 bisects the peak P1 at its highest voltage point. It then crosses the zero line and runs through the cross-over point of the phase B and C curves at the cross-over circle or point T1. The portion of the B phase curve between the reference point V1 and the cross-over point T1 is the return path for the current resulting from the first half of the peak P1 of the A phase, and the portion of the C phase curve between the cross-over point T1 and the reference point V2 is the return path for the current resulting from the last half of the peak P1 of the A phase. This can be explained by considering the circuit diagram of FIG. 8 and the composite curve diagram of FIG. 6 in connection with one another. For purposes of discussion, it will be assumed that the current due to the half cycle loop above the zero line in FIG. 6 of the drawings flows in the direction of the arrows A1, B1 and C1 (FIG. 8), and that the current due to the half cycle loops below the zero line of FIG. 6 flows in the direction of the arrows A2, B2 and C2 (FIG. 8). It is further assumed that if current flows in a direction of the arrows A1, B1 and C1, the leads LA, LB and LC respectively will have positive polarity while the common connection point CCP will have negative polarity, and that if current flows in the direction of the arrows A2, B2 and C2, the leads LA, LB and LC respectively will have negative polarity while the common connection point CCP will have positive polarity.

With the above assumptions in mind, it will be recognized that during the entire peak P1 of phase A, the lead LA will have positive polarity while the other end of the A phase joined to the common connection point CCP will have negative polarity. Current due to the peak P1 will therefore flow out through lead LA, in the direction of the arrow A1, to the stem of the rectifier RA1 and out the body of that rectifier into the working circuits of the alternator through the positive lead connection. Through the first half of the duration of peak P1 for the phase A, the return circuit is completed through the body of the rectifier RB2 through the lead LB and the string of the B phase coils, in the direction of the arrow B2, to the common connection point CCP which is now positive with respect to the B phase. Through the second half of the duration of the peak P1 for the phase A, the return circuit is completed through the body of rectifier RC2 through the lead LC and the string of C phase coils, in the direction of the arrow C2, to the common connection point CCP which is now positive with respect to the C phase. Since the peak and return path voltages have opposite polarity at the common connection point CCP, they will be joined in series and their voltages will be added to result in direct current pulses in the working circuits of the alternator, after the rectifier complex.

The resultant rectified no load voltage out of the rectifier complex is represented by the curve above the three phase composite curve in FIG. 6 of the drawings. On the vertical line X5, at the end of peak P7 where the dotted return path of the phase A curve begins, the voltage above the zero line is identified as V3. On the same vertical reference line X5, peak P8 begins and the voltage below the zero line at that point is identified as V4. These voltages are added together as previously been explained, and result in a peak, also on the vertical reference line X5 in the direct current curve which peak has been identified as DC7. On vertical reference line X6, the highest voltage in peak P9, above the zero line, is designated as V6, and the lowest voltage at the cross-over point of the same vertical reference line X6 is designated as V7. When voltages V6 and V7 are added together, they result in a dip in the direct current curve which is identified DC9. The peaks of the direct current curve will be materially reduced when a load is connected across the output terminals of the rectifier system, and if a vehicle battery is made parallel to the output circuit the considerable capacitance effect of the battery will virtually obliterate any fluxuations in voltage in the working circuits of the alternator.

The operation of the alternator 10 is as follows:

When the exciting coil 48 is energized from a direct current source, such as a storage battery in a vehicle, unidirectional magnetic flux will be created in the magnetizable stationary support member 12 and the rotatable exciter pole pieces 28, 28', and thus in the poles 34 of the exciter pole pieces. The flux path between the stationary support member 12 and the exciter pole pieces 28, 28' will be completed across the predetermined annular gaps 46, 46, which gaps are continuously maintained by the bearing assemblies 20, to avoid any change in the reluctance of the gaps. This aspect, together with the same polarity of the flux across the gaps 46, avoids any braking effect between the stationary and rotary elements of the alternator. Rotation of the exciter pole pieces 28, 28' will cause the unidirectional flux path to be completed through the stator poles 70 which flux will be of the alternating variety in view of the fact that any given pole in the stator is passed alternately by exciter poles 34 of opposite polarity, resulting from the interlacing of the exciter pole pieces 28 as shown in FIG. 3 of the drawings. The three phase output winding 60 associated with the stator 58 creates a series of overlapping peak voltages which are rectified to convert the alternating current to direct current.

Figure 9:
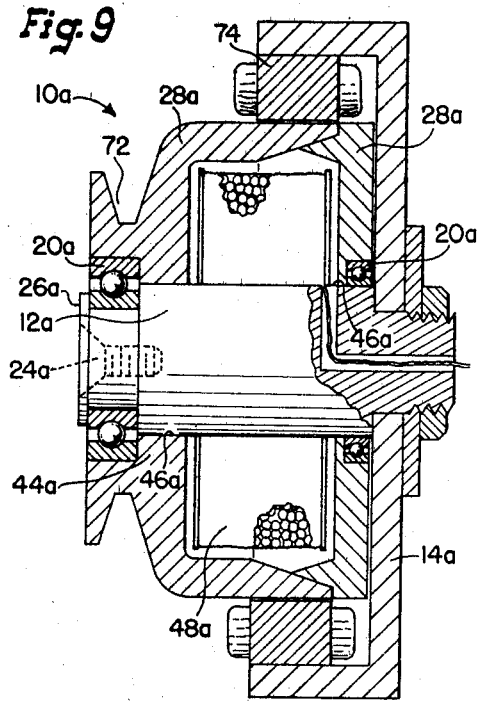
FIG. 9 is a side elevational sectional view illustrating a modified form of brushless alternator which is within the purview of the present invention.

Reference is now made to FIG. 9 of the drawings which shows a modified form of alternator device which is within the purview of the present invention. Since the alternator illustrated in FIG. 9 utilizes the basic principles of the present invention, the same reference numerals will be employed as in the FIGS. 1–3 embodiment with the suffix "a" used to designate like parts. It will be seen that the brushless alternator generally designated 10a includes a stationary support member 12a with rotatable exciter pole pieces 28a, 28'a of slightly modified form mounted upon bearing assemblies 20a to provide relative movement of the exciter pole pieces 28a, 28a' relative to the stationary support member 12a in the same manner as the FIGS. 1–3 embodiment. It will be noted that the exciter pole piece at the lefthand side of FIG. 9 includes a V-belt groove 72 by which the exciter pole pieces 28a, 28a' may be driven.

Figure 11:
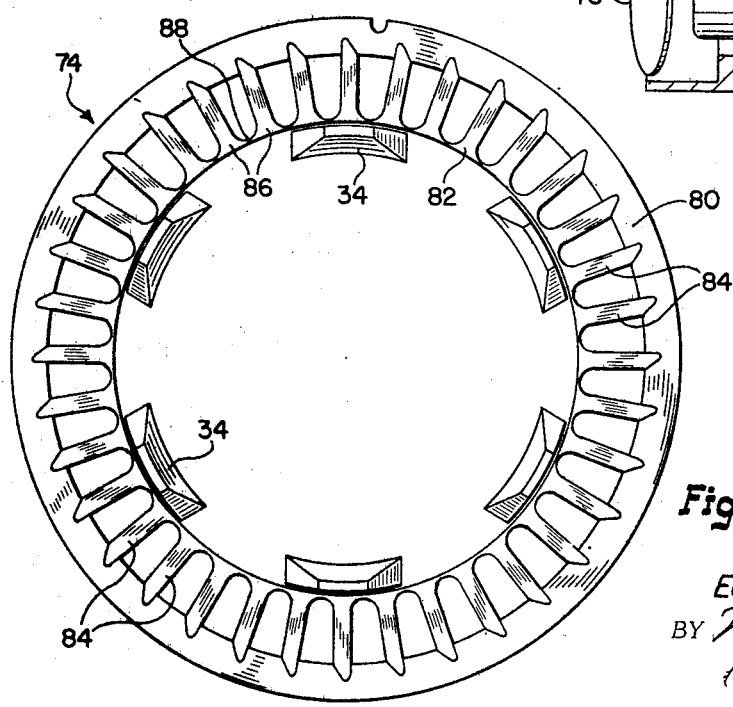
FIG. 11 is a side elevational view, partially diagrammatic in form with respect to another form of stator device, which may also be used with the brushless alternator of the present invention.

In the FIG. 9 embodiment, the stator element is affixed to the bracket or housing member 14a, and thus is fixedly mounted relative to the stationary support member 12a, externally of the exciter pole pieces 28a, 28a'. The stator element in the FIG. 9 embodiment is designated 74 and includes a plurality of inwardly extending pole tips, rather than the externally extending pole tips as in the stator construction 58 shown in FIGS. 4–5 and 7 of the drawings. One type of stator construction which may be used for the stator 74 is illustrated in FIG. 11 of the drawings and will be presently described.

The operation of the brushless alternator 10a is generally the same as in the FIGS. 1–3 embodiment. Because the stator element 74 is mounted externally of the exciter pole pieces 28a, 28a' the leads from the output winding associated with the stator element may be brought out directly from the stator element without having to be positioned within a passageway of the stationary element as in the FIGS. 1–3 embodiment.

Figure 10:
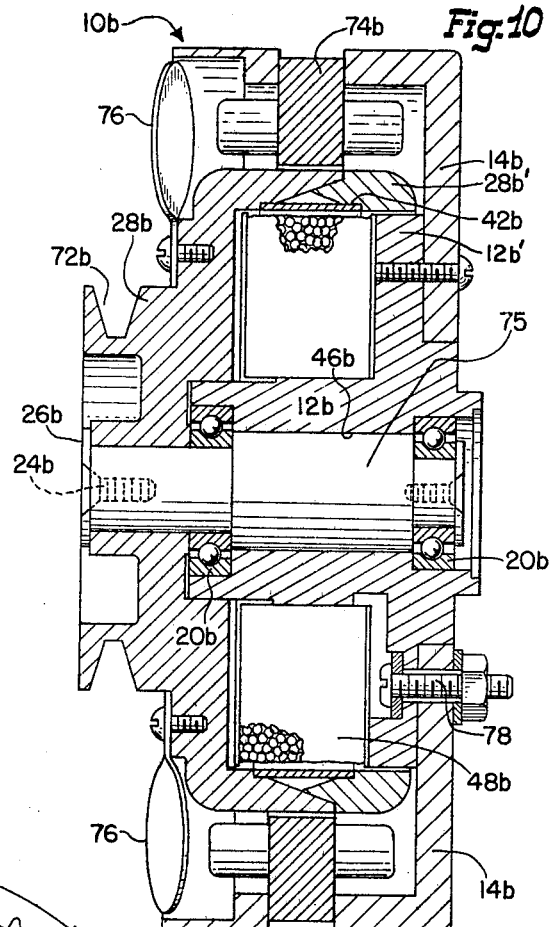
FIG. 10 is a side elevational sectional view illustrating another modified form of brushless alternator which comes within the scope of the present invention.

Another modified form of brushless alternator is shown in FIG. 10 of the drawings and utilizes the suffix "b" to designate similar parts with the FIGS. 1–3 embodiment. The brushless alternator 10b includes a centrally positioned shaft or post 75. The shaft 75 in this FIG. 10 embodiment is rotatable with the pole piece 28b at the lefthand side of FIG. 10 which includes the V-shaped groove 72b which is provided for use with a belt. Because there is movement of the exciter pole pieces 28b, 28b' relative to the stationary support member or magnetic sleeve 12b, unidirectional magnetic flux will be completed as in the previous embodiments.

The exciter pole piece 28b, at the lefthand side of FIG. 10 may include fan blades 76, as illustrated, and thus the alternator will combine generating and cooling functions for use on a vehicle if such is desired.

The stator element 74b in the FIG. 10 embodiment is also externally mounted of the exciter pole pieces 28b, 28b by being mounted to the bracket or base 14b which, in this particular instance, is fixedly mounted to the flange portion 12b' of magnetic sleeve or support member 12b at the righthand side of FIG. 10. Further, since the exciter coil 48b is fixedly mounted to the magnetic sleeve 12b at the right hand side of FIG. 10, the non-grounded lead thereof may be brought out directly through the magnetic sleeve 12b and the bracket 14b as at 78.

It will be noted that the exciter pole piece 28b at the right hand side of FIG. 10 is joined to the exciter pole piece 28b at the left hand side of FIG. 10 by a non-magnetic ring 42b. The exciter pole piece 28b' at the right hand side of FIG. 10 is designed to rotate in close proximity to the magnetic sleeve 12b, while both of said exciter pole pieces 28b, 28b' in the FIG. 10 embodiment are adapted to rotate or move in close proximity to the fixed stator for inducing an alternating voltage in the output winding thereof in the manner previously described.

In FIG. 11 of the drawings, one form of stator element 74 which may be used with the FIGS. 9–10 embodiments is illustrated. The stator element generally designated by numeral 74 shown in FIG. 11 of the drawings is a two piece device comprising an outer ring portion 80 and an inner ring portion 82. The outer and inner rings 80, 82 may be separated from one another in a punch press operation to permit windings to be inserted upon the teeth 84 of the inner ring portion. The windings may be in the form of prewound ribbons or comprise the usual winding form as may be desired. Each of the stator teeth 84 at the inner periphery thereof form pole tips 86 which have a thickened section, and which are joined by relatively thin connecting webs 88. There will be a slight leakage across the connecting webs 88; however, this will occur at only every third pole of the stator, since the exciter poles will cover three stator poles, and the cross-sections of the web are so small that leakage of flux may be virtually ignored. After the windings or coils have been inserted upon the stator teeth 84, the outer ring portion 80 is then reassociated with the inner ring portion 82, the inwardly opening notches in the outer ring portion 82 serving to reorient and provide proper repositioning of the outer and inner ring portions 80, 82 with respect to one another. If it is desired to reposition the outer and inner rings 80, 82 in exactly the same manner as stamped, one of the inwardly opening notches of the outer ring portion 80 and complementary formation of the stator tooth may be reversed to provide an orienting means for predetermined repositioning of the outer and inner ring portions 80, 82 relative to one another. When thus assembled, the stator element 74 may be useful in the FIGS. 9–10 embodiments or in other potential applications which will be apparent to those skilled in the art.

From the foregoing, it will be appreciated that the present invention discloses a novel brushless alternator device, including preferred forms of stator constructions usable with such a device, which provides improved manufacturing and operational characteristic than have previously been achieved by prior art alternators. It is to be understood that the specific examples of the invention herein shown and described are for illustrative purposes only. Changes in structure will no doubt occur to those skilled in the art and will be understood as forming a part of this invention insofar as they fall within the spirit and scope of the appended claims.

What is claimed is:

1. A brushless alternator comprising a stationary axially extending support member of magnetic material adapted to be supported solely by a base member attached to one of its ends, a stationary exciter winding mounted on said axially extending support member intermediate the ends thereof, bearing means mounted at axially spaced portions of said support member remotely positioned relative to said exciter winding, rotor means including first and second pole pieces having integral exciter poles interleaved with respect to each other, said rotor means being supported on said support member by each of said bearing means, said rotor means being spaced from said support member at each end of said exciter winding by annular air gaps of limited radial extent, said air gaps being part of a unidirectional flux path established through said support member, said first and second pole pieces, and stator means positioned immediately adjacent the interleaved poles and radially outwardly of said exciter winding when said exciter winding is connected to a power source.

2. The brushless alternator as defined in claim 1 wherein said stator means is mounted on said exciting winding.

3. The brushless alternator as defined in claim 1 wherein said stator means is mounted on said base member.

4. The brushless alternator as defined in claim 1 wherein said rotor means includes a shaft positioned internally of said support member and in engagement with each of said bearing means.

5. The brushless alternator as defined in claim 4 wherein said shaft is attached to a radially extending wall portion of said first pole piece and said second pole piece is carried by said first pole piece and connected thereto by means comprising material of low magnetic permeability.

6. The brushless alternator as defined in claim 5 wherein said shaft is of magnetic material, said shaft being slightly spaced from the portions of said support member between said bearing means by an annular radially extending air gap, said shaft and annular air gap being part of said unidirectional flux path.

7. The brushless alternator as defined in claim 5 wherein the minimum internal diameter of said second pole piece is slightly greater than the maximum diameter of said exciting winding said support member comprising a sleeve portion surrounding said shaft and a radially extending flange portion extending outwardly therefrom adjacent one side of said exciting winding, said flange portion being attached to said housing member by a plurality of fasteners, said base member including a portion on which said stator means is mounted in radial alignment with said exciter winding and said interleaved exciter poles.

8. A brushless alternator including a stator having an output winding and an exciting system therefor, said exciting system comprising a stationary annular support member of magnetic material, a rotatable shaft member of magnetic material journaled for rotation within said stationary annular support member, bearing means at axially spaced portions of the shaft member to permit relative rotational movement of the shaft member with respect to the stationary annular support member, the outer surface of said shaft member between said axially spaced portions being in close proximity to the inner surface of said stationary annular member and cooperating therewith to define an annular air gap of limited radial extent sufficient to permit a unidirectional flux path to be established through said air gap and said central support member, a first pole piece including a predetermined number of exciter poles and a transverse wall of magnetic material attached to and rotatable with said shaft member, a second pole piece carried by and secured against movement relative to the first pole piece by means comprising material of low magnetic permeability attached to each of said pole pieces, said second pole piece having a corresponding number of integral exciter poles interleaved with respect to the exciter poles of the first pole piece, said second pole piece being adapted to rotate in close proximity to the stationary annular support member to carry the flux path therethrough, said exciting system further including a stationary exciter winding surrounding said shaft member and at least a portion of said stationary annular member to initiate and sustain the unidirectional flux path, and said exciter poles of said first and second exciter pole pieces being adapted to rotate in close proximity to said stator to induce an alternating voltage in the ouput winding thereof.

9. A stator for a brushless alternator or the like comprising a magnetizable ring having a plurality of alternating deep and shallow generally radially directed slots formed in the outer periphery of said ring and extending further than and less than respectively of a circular midline in said ring, each pair of adjacent deep slots defining a stator pole which is bisected by one of said shallow slots to define a pair of short stator poles, and an output winding arranged in both said deep and shallow slots.

10. The stator as defined in claim 9 wherein said shallow slots are approximately one half the radial length of said deep slots.

11. The stator as defined in claim 9 wherein each slot is configured to provide a restricted throat in the vicinity of its intersection with the outer periphery of said ring.

12. The stator as defined in claim 9 wherein each slot has a generally elongated triangular shape.

13. The stator as defined in claim 9 wherein said output winding is wound in repetitive fashion into every other shallow and deep slot of the stator ring.

14. The stator as defined in claim 9 wherein the output winding comprises a three phase winding having three sets of winding coils, each of the winding coils in said three sets being wound in sequence into every other deep and shallow slot.

15. A stator for a brushless alternator or the like comprising inner and outer ring portions, the inner ring portion having a plurality of outwardly opening slots into which output windings are inserted, the slots of the inner portion defining stator poles, said inner ring portion having relatively thin bridge portions integral with said poles to retain said poles together while minimizng magnetic flux leakage between adjacent poles, said inner and outer ring portions being secured together to close magnetic paths around conductors of the windings.

16. A stator for a brushless alternator comprising associated inner and outer interfitting ring portions, the inner ring portion having a plurality of outwardly opening slots formed about the circumference thereof, said slots terminating short of the inner periphery of the inner ring portion to provide thin connecting webs which join adjacent remaining material sections of the inner ring portion to each other, said outer ring portion having a corresponding number of inwardly extending openings which are complementary configured relative to the outerfree extremity of the remaining material sections of the inner ring portion to permit interfitting of the inner and outer ring portions relative to one another, and an output winding positioned in the outwardly opening slots of the inner ring portion prior to the assembly of the inner and outer ring portions to each other.

17. A stator of the type defined in claim 16 wherein said inner and outer rings are provided with means for orienting the same in predetermined relationship to each other.

References Cited

UNITED STATES PATENTS

| | | | |
|---|---|---|---|
| 2,274,070 | 2/1942 | Kauders | 310—212 |
| 2,802,959 | 8/1957 | Powers | 310—263 |
| 3,134,039 | 5/1964 | Bosch | 310—263 |
| 3,215,877 | 11/1965 | Raver | 310—168 |
| 3,215,878 | 11/1965 | Woodward | 310—263 |
| 3,233,132 | 2/1966 | Terry | 310—168 |
| 2,987,637 | 2/1961 | Bertsche | 310—266 |
| 3,312,844 | 6/1967 | Juhnke | 310—266 |
| 3,319,100 | 5/1967 | Erickson | 310—263 |

FOREIGN PATENTS 1,360,344  3/1964  France.

OTHER REFERENCES

German Patent Publication 1,056,727; dated 5,1957; inventor's name—Dr. Wingen; 310/312.

MILTON O. HIRSHFIELD, Primary Examiner

R. SKUDY, Assistant Examiner

U.S. Cl. X.R.

310—67, 171, 254, 263